Nov. 25, 1969     C. GARNETT     3,480,537
ELECTROCHEMICAL MARKING ARRANGEMENT WITH CURRENT LIMITING DEVICE
Filed Oct. 5, 1966     2 Sheets-Sheet 1

INVENTOR.
CLIFFORD GARNETT
BY
Baldwin, Doran & Egan
ATTORNEYS

United States Patent Office 3,480,537
Patented Nov. 25, 1969

3,480,537
ELECTROCHEMICAL MARKING ARRANGEMENT WITH CURRENT LIMITING DEVICE
Clifford Garnett, Calmady, Darby Gardens, Sunbury-on-Thames, Surrey, England
Filed Oct. 5, 1966, Ser. No. 584,506
Claims priority, application Great Britain, Oct. 8, 1965, 42,848/65
Int. Cl. C23b 5/68
U.S. Cl. 204—224                                                4 Claims

ABSTRACT OF THE DISCLOSURE

An electro-chemical marking arrangement comprises a stencil applied to a metal workpiece and having an electrolyte-retaining pad contacting the upper surface of the stencil and a metal base in contact with the pad. An electronically controlled current supply connected between the base and the workpiece incorporates a current-limiting device comprising a bridge rectifier, the current through which is controlled by a silicon controlled rectifier. A pulse generator is connected with the unsmoothed voltage output of the bridge rectifier so that each pulse turns on the silicon controlled rectifier, and a current sensing device in circuit with the bridge rectifier is arranged to delay the delivery of each pulse as the current sensed by the device increases so as to delay the turning on of the silicon controlled rectifier to a later point in the positive half-cycle, whereby to limit the current to the bridge rectifier.

---

The invention relates to electro-chemical marking arrangements, by means of which a metal workpiece can be electro-chemically marked. Such arrangements comprise a marking device adapted to retain an electrolyte in electrical contact with the device on the one hand and with selected areas of the workpiece on the other hand, e.g. through a stencil. The workpiece is connected to one side of an electrical supply, the other side of the supply being connected to the marking device, which may incorporate a pad soaked in electrolyte in contact with the opposite side of the said stencil from the workpiece. Such marking arrangements are well known, but practical difficulties have been experienced due to the fact that different sizes and forms of mark require different conditions of electrolyte and electrical supply. It has been common practice to control the voltage applied, but a voltage which is suitable for etching a mark of low density may be such as to cause burning of the stencil when used with the same electrolyte for etching a high density mark, i.e. a mark in which the etched portions occupy a large proportion of the area of the whole mark.

According to the present invention an electro-chemical marking arrangement comprises an electronically-controlled current supply incorporating a current-limiting device. Preferably the current-limiting device is in the form of a circuit employing semiconductor devices, thus avoiding the use of moving contacts. The use of a current-limiting device effectively prevents the burning of stencils in the etching of dense marks, since the current density can be kept below the critical level.

According to a further feature of the invention the current supply circuit also incorporates a timing device in the form of a circuit incorporating semiconductor devices, which can be set to cut off the supply of current after a desired interval of time.

Figure 1:
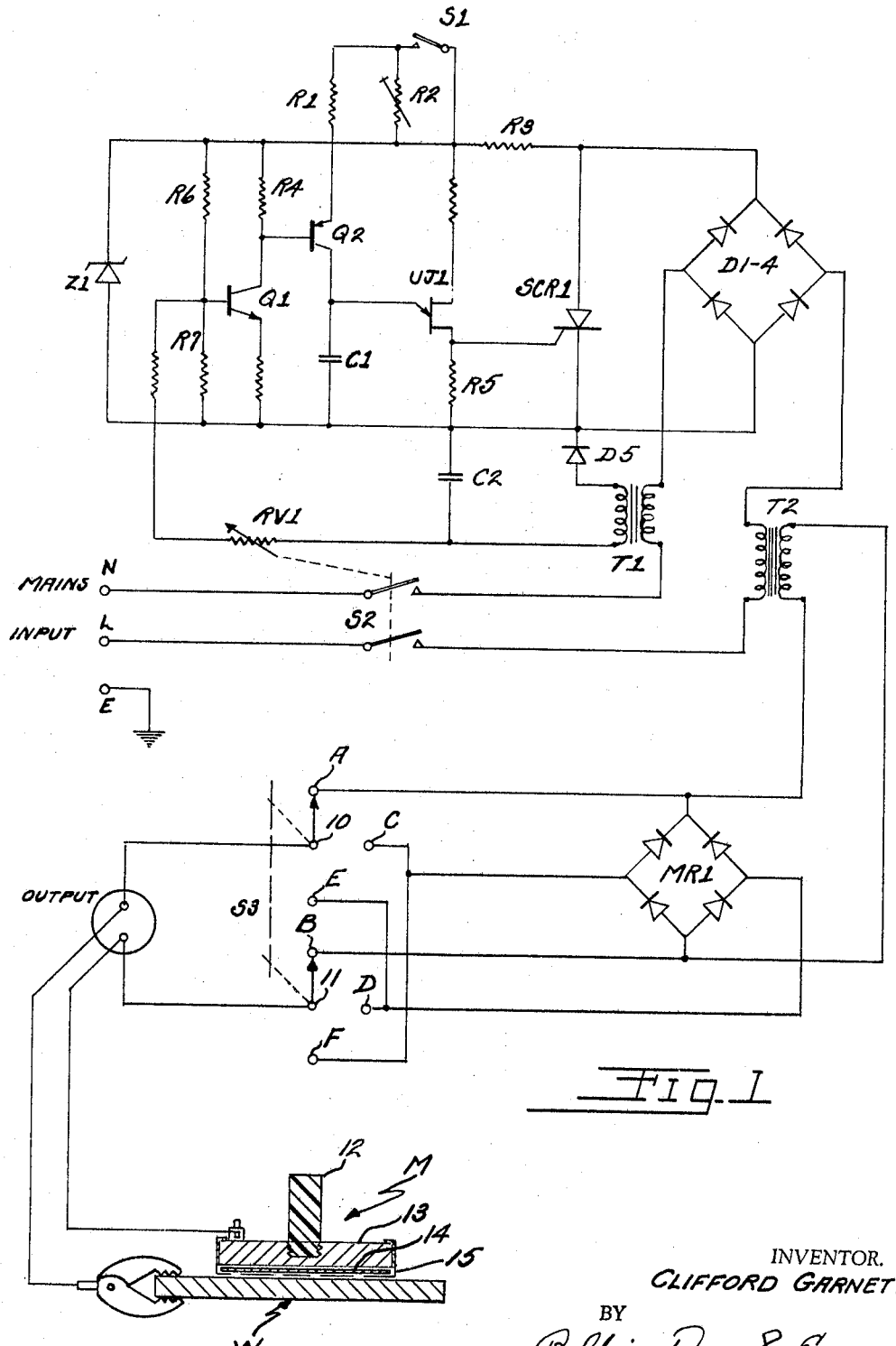
Figure 2:
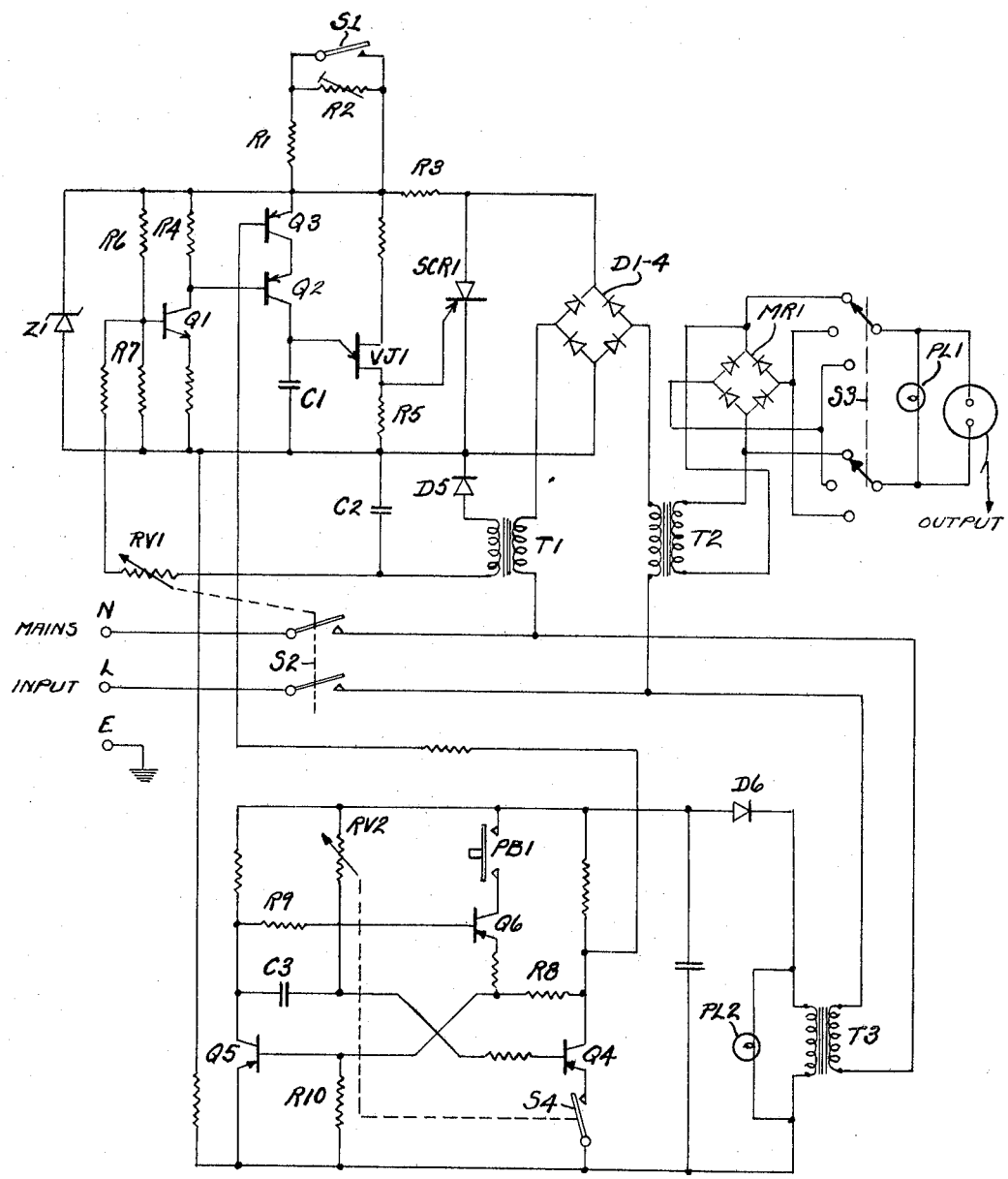

Two embodiments of the invention will now be described in more detail by way of example and with reference to the accompanying drawings, in which:

FIGURE 1 is a circuit diagram illustrating a constant-current supply circuit incorporating a current-limiting device, connected to an electro-chemical marking device, and FIGURE 2 is a circuit diagram of a similar constant-current supply circuit modified to incorporate a timing device.

In the circuit shown in FIGURE 1, the mains supply is fed to the primary winding of a transformer T2 through a switch S2, the primary of a second transformer T1 and a full-wave bridge rectifier D1–4. T1 is a current sensing transformer; the output from its secondary is rectified by a half-wave rectifier D5. The current through the bridge D1–4 and consequently the current through the primary of T2 is controlled by a silicon controlled rectifier SCR1. When SCR1 is turned off there is no bridge current and so there is no mains input current and no output from the secondary of T2. When SCR1 is turned on, the bridge conducts and the secondary of T2 feeds the output to the electro-chemical marking device via switch S3. In the position of S3 shown, the sine-wave output from T2 is fed through contacts A, B to terminals 10, 11, and directly to the marking device M and the workpiece W. In the alternative positions of S3, the output is rectified by bridge MR1 and fed through contacts C, D, or E, F, (reversed polarity) to terminals 10, 11, and so to the marking device and workpiece. FIGURE 1 illustrates the marking device M as being of the kind having an insulating handle 12, metal base 13, an electrolyte-retaining pad 14 and a stencil 15.

A pulse-generating network, supplied by the rectified unsmoothed voltage output from bridge D1–4, is formed by a unijunction transistor UJ1, capacitor C1, transistor Q2 and resistances R1 and R2. Capacitor C1 is charged through resistances R3, R2 and R1 and transistor Q2 and discharges trigger pulses through transistor UJ1 and resistance R5. This network runs at 100 cycles per second (the unsmoothed bridge output), equal to twice the mains frequency. The voltage supply for the transistors is reduced to 20 volts by Zener diode Z1 and resistance R3. Transistor Q1 has its base connected through variable resistance RV1 to the secondary of transformer T1 and its collector connected to the base of Q2, and forms a current sensing amplifier. It is biassed by a pair of resistors R6, R7. When no signal is received from the secondary of T1, the output from Q1 is sufficient to keep Q2 fully conducting. In this state the charging time of C1 is a minimum and the trigger pulse resulting from a discharge of C1 and transmitted from UJ1 to SCR1 causes bridge conduction early in the positive half cycle, resulting in maximum output.

As the output load increases, the current in the primary of T2 increases and this increase is sensed in T1. The output from the secondary of T1 is fed to the base of Q1 as a reverse bias. As the current through Q1 is reduced, the collector end of R4 tends to go positive thereby reducing the current through Q2. This in turn increases the charging time of C1, resulting in the trigger pulse and consequent bridge conduction occurring later in the cycle and thereby causing a reduction in the output of the supply circuit from the secondary of T2.

The current level required is set by the adjustable resistor RV1. RV1 is set at minimum resistance for minimum output current. Switch S1 is used to obtain two separate current ranges. For low setting, R2 is in series with R1 (S1 open). For high setting, R2 is shorted out (S1 closed). In one particular example, with S1 closed to cut out R2, the current range is approximately 2 to 10 amps with a maximum voltage of approximately 27 volts, and with S1 open the current range is 100 ma. to 2 a. with a maximum voltage of approximately 15 volts.

In short circuit conditions, Q1 and Q2 are fully turned off and thus UJ1 does not deliver pulses to SCR1. Thus there is not output whatsoever until the short circuit is removed.

In the embodiment shown in FIGURE 2, the circuit is similar to that shown in FIGURE 1 apart from the incorporation of a timing circuit (shown in the lower part of FIGURE 2) which is fed from the mains input through a transformer T3 and rectifier D6, and which allows the output to the marking device to be switched on for a set period. Pilot lights PL1 and PL2 are provided in this case to give visual indications respectively that an output is available for the marking device and that the marking device is actually alive.

The pulse generating network is similar to that of FIGURE 1, with the exception of an additional series transistor Q3. The timing circuit employs a one-shot multivibrator. The period for which the output is switched on (1 to 10 seconds) is set by a variable resistor RV2. The timing circuit can be switched out by means of switch S4. When S4 is open, the collector of transistor Q4 is negative, the additional series transistor Q3 in the pulse generating network is thereby forward biassed and turned on, and the circuit operates in the same manner as described with reference to FIGURE 1.

When S4 is closed, the transistor Q5 is reverse biassed through R8 and R10 so as to be turned off. Q4 is on, being forward biassed through RV2, and therefore conducts. The collector of Q4 goes positive and reverse biasses Q3. As a result C1 cannot charge and thus there is no output from the supply circuit.

With S4 still closed, the timing circuit is actuated manually by push-button PB1. When PB1 is pressed, Q6 conducts, being kept on by a forward bias through R9. The voltage at the adjacent end of R8 drops, so that Q5 is forward biassed and turns on, thereby commencing to charge capacitor C3. A positive pulse via R9 turns off transistor Q6, whereupon the voltage at the adjacent end of R8 rises again, turning off Q5 and terminating the charging pulse. The rise in voltage on C3 meanwhile has turned off Q4, so that its collector goes negative; Q3 is thereby forward biassed allowing C1 to charge normally and output is available until the capacitor C3 has discharged through RV2, whereupon the circuit returns to its original state with Q5 remaining off and Q4 coming on again, thus supplying the reverse bias to Q3 and preventing the charging of C1 so as to terminate the output.

The invention provides a reliable and effective constant-current source of either sine-wave current or a D.C. of either polarity for electro-chemical marking techniques, which overcomes many of the difficulties heretofore experienced.

What I claim as my invention and desire to secure by Letters Patent is:

1. An electro-chemical marking arrangement, comprising a marking device adapted to retain an electrolyte in electrical contact with the device on the one hand and with selected areas of a metal workpiece on the other hand, and an electronically-controlled current supply whose output is adapted to be connected to the device and to the workpiece, said current supply incorporating a current-limiting device, wherein the current-limiting device is in the form of a circuit which comprises a bridge rectifier, a silicon controlled rectifier controlling the current through the bridge rectifier, a pulse-generating network operating at the frequency of the unsmoothed voltage output of the bridge rectifier and connected so that each pulse turns on the silicon controlled rectifier, a current-sensing device connected in the circuit to the bridge rectifier, and means for delaying the delivery of each pulse as the current sensed by the said device increases, so as to delay turning on of the silicon controlled rectifier to a later point in the positive half-cycle thereby to limit the current in the circuit to the bridge rectifier.

2. An electro-chemical marking arrangement according to claim 1, wherein the output of the current supply is derived from the secondary of a transformer whose primary is connected in the circuit to the bridge rectifier.

3. An electro-chemical marking arrangement according to claim 1, wherein the current supply also incorporates a timing device comprising a semi-conductor device connected so as normally to block operation of the pulse-generating network, means for unblocking said semi-conductor device on actuation of the timing device, and a time-delay device incorporating a capacitor and variable resistor arranged to return the network to its blocked condition after a delay dependent on the setting of the variable resistor.

4. An electro-chemical marking arrangement according to claim 3, wherein the semiconductor device is a transistor connected in the pulse-generating network and the means for unblocking said device comprises a further transistor which is turned off by the potential on the capacitor when the latter is charged on actuation of the timing device and which is turned on again when said capacitor has discharged.

References Cited

UNITED STATES PATENTS

| | | | |
|---|---|---|---|
| 2,046,440 | 7/1936 | Adey | 204—228 XR |
| 2,726,200 | 12/1955 | Holsapple | 204—224 XR |
| 3,146,392 | 8/1964 | Sylvan | 323—24 XR |
| 3,375,428 | 3/1968 | Mitchell | 323—22 XR |
| 3,395,334 | 7/1968 | Stein | 323—22 |
| 3,433,728 | 3/1969 | Petroff | 204—224 |

FOREIGN PATENTS 936,566   9/1963   Great Britain.

HOWARD S. WILLIAMS, Primary Examiner

D. R. VALENTINE, Assistant Examiner

U.S. Cl. X.R.

204—228; 323—24